(12) United States Patent
Ichikawa et al.

(10) Patent No.: US 8,080,190 B2
(45) Date of Patent: Dec. 20, 2011

(54) METHOD OF MOLDING A TONER BOTTLE USING UP TO 8-SIDED RECYCLED FLAKE

(75) Inventors: Kazuo Ichikawa, Fuji (JP); Mitsuo Owashi, Numazu (JP)

(73) Assignee: Ricoh Company Limited, Tokyo (JP)

( * ) Notice: Subject to any disclaimer, the term of this patent is extended or adjusted under 35 U.S.C. 154(b) by 793 days.

(21) Appl. No.: 11/670,225

(22) Filed: Feb. 1, 2007

(65) Prior Publication Data

US 2007/0200269 A1 Aug. 30, 2007

(30) Foreign Application Priority Data

Feb. 2, 2006 (JP) .................. 2006-025314

(51) Int. Cl.
- B29C 73/00 (2006.01)
- B29C 45/00 (2006.01)
- B29C 39/02 (2006.01)
- B32B 43/00 (2006.01)
- B29B 7/00 (2006.01)
- D01D 5/40 (2006.01)

(52) U.S. Cl. .................. 264/36.1; 264/328.1; 264/537; 264/140

(58) Field of Classification Search .................. None
See application file for complete search history.

(56) References Cited

U.S. PATENT DOCUMENTS

| 3,960,335 A * | 6/1976 | Haberle .................. 241/236 |
| 5,603,413 A * | 2/1997 | Mitchum, Jr. .................. 209/580 |
| 5,899,392 A | 5/1999 | Hayward et al. |
| 6,624,258 B1 * | 9/2003 | Nikkeshi .................. 525/408 |
| 2005/0174406 A1 | 8/2005 | Morriss et al. |
| 2006/0180518 A1 | 8/2006 | Kashikura et al. |

FOREIGN PATENT DOCUMENTS

| EP | 0 666 285 B1 | 5/2000 |
| EP | 0 779 136 B1 | 1/2002 |
| EP | 1 555 209 A1 | 7/2005 |
| JP | 9-192523 | 7/1997 |
| JP | 2001-54911 | 2/2001 |
| JP | 2001-191366 | 7/2001 |
| JP | 2002-102735 | 4/2002 |
| JP | 2002-221858 | 8/2002 |
| JP | 2002-240120 | 8/2002 |

(Continued)

OTHER PUBLICATIONS

Awaja et al., Recycling of PET, Mar. 16, 2005, European Polymer Journal, Ed. 4m pp. 1453-1477.*

(Continued)

*Primary Examiner* — Christina Johnson
*Assistant Examiner* — Benjamin Schiffman
(74) *Attorney, Agent, or Firm* — Oblon, Spivak, McClelland, Maier & Neustadt, L.L.P.

(57) ABSTRACT

A method of molding a toner bottle including separating polyethylene terephthalate (PET) bottles that have not accommodated oily or colored materials from retrieved PET bottles grinding the separated PET bottles to obtain a flake PET material of which not less than 80% has a form from a triangle to an octagon with a size not greater than 8 mm 8 mm, washing and drying the flake PET material to obtain a flake PET molding material and molding the flake PET molding material to make a toner bottles.

10 Claims, 6 Drawing Sheets

FOREIGN PATENT DOCUMENTS

| | | |
|---|---|---|
| JP | 3347201 | 9/2002 |
| JP | 2003-35989 | 2/2003 |
| JP | 2003-221498 | 8/2003 |
| JP | 2003-311795 | 11/2003 |
| JP | 2004-003876 | 1/2004 |
| JP | 2004-136510 | 5/2004 |
| JP | 2005-193575 | 7/2005 |

OTHER PUBLICATIONS

Japanese Office Action issued Jun. 29, 2011 in connection with corresponding Japanese Patent Application No. 2006-025314, filed Feb. 2, 2006.

* cited by examiner

METHOD OF MOLDING A TONER BOTTLE USING UP TO 8-SIDED RECYCLED FLAKE

BACKGROUND OF THE INVENTION

1. Field of the Invention

The present invention relates to a toner bottle, a method of molding the toner bottle, a method of including the toner bottle for use in an image forming apparatus in which a developing agent and/or a toner is filled and applied to the developing portion.

2. Description of the Related Art

As shown in FIG. 1A, polyethylene terephthalate (PET) bottles used for drinking are collected by a recycling manufacturer. Subsequent to washing and grinding, the collected PET bottles are sent to a recycling PET material processing trader by which the collected PET bottles are processed to materials for molding. Typical processes of collecting and processing PET bottles are:

(1) consumers separate PET bottles from other waste materials and take the PET bottles to a collecting place set by a local government;

(2) the local government selects and stores the PET bottles which are compressed and packed in bale form;

(3) a recycling manufacturer further selects, washes, resorts and grinds the bale material to a size of about 8 mm×8 mm. Subsequent to washing and drying, flake is obtained;

(4) A recycling PET material processing trader melts the flake. Thereafter, the melted flake is subject to surface crystallization treatment to obtain pellets (i.e., small particles); and (5) The pellets are blended with flakes flame retardants and polycarbonate, injection molded and thereafter subject to heating and stretch blow molding.

In one embodiment of the invention the process of forming pellets from flakes must be carried out before forming the PET toner bottle because of the following reasons:

The main reason of forming pellets is to obtain uniform particles. Non-uniform particles tend to clog at a hopper or a mixing and kneading screw in an injection molding device, which causes trouble for continuous production Furthermore, when pellets are formed, moisture in the materials is uniformly contained. That is, when moisture is not uniformly contained, the moisture has an adverse effect when molding pellets to a toner bottle, which leads to deterioration in the strength of the material Published unexamined Japanese patent application no. (hereinafter referred to as JOP) 2001-54911 describes a PET material recycling device for recycling waste plastic containers, for example, PET bottles, having a coarse grinding machine which grinds material to a size at least twice as large as a typically ground size i.e., a size which can pass through a screen mesh having a diameter of from 6 to 12 mm) and an air classifier which can air-classify the coarse light fragments and the coarse heavy fragments which have been ground by the coarse grinding machine. The size of the typical ground fragment is, e.g., from 6 to 12 mm, but a method of suitably obtaining ground fragments for a toner bottle is not disclosed.

As described in JOP 2003-221498, PET bottles are not reused because hopper bridging occurs when ground flake PET is placed in a molding machine. In addition, a deterioration in the physical properties of the PET is caused by hydrolysis inducing degradation.

Even when such ground flake PET is heated and melted by an extruder to prevent bridging and to obtain pellet PET, the pelletized ground PET is amorphous having a glass transition temperature of from about 70 to 80° C. and a crystallization temperature of from about 120 to 130° C. at temperature rising. Thus, blocking easily occurs during preparatory drying before molding and solidification by crystallization in a molding device cylinder and/or barrel during plasticizing is accelerated, which easily makes the screw of molding device stop.

With regard to the process of molding recycled PET to make a toner bottle described in JOP 2002-22188 an expensive phthalic acid based plasticizer is required when only recycled materials are used because the recycled materials do not have a good stretching property. In JOP 2005-193575 recycled materials are adjusted by regulating the melting conditions; however, this is not sufficient for obtaining a good product.

SUMMARY OF THE INVENTION

Because of the deficiencies of the prior art processes, the present inventors recognized that a need exists for improving the productivity of producing toner bottles by simplifying the process of recycling PET materials.

Accordingly, an object of the present invention is to provide a method of improving the productivity of producing toner bottles from recycled materials and further to provide a method of improving the productivity of producing toner bottles using recycled materials.

Another object of the invention is to provide a method of improving the productivity of producing toner bottles from recycled materials and further to provide a method of improving the productivity of producing toner bottles using recycled materials.

Briefly these objects and other objects of the present invention as hereinafter described will become more readily apparent and can be attained, either individually or in combination thereof, by a method of molding a toner bottle including; grinding the separated PET bottles to obtain a flake PET material of which not less than 80% by weight based on the weight of the PET have a form from a triangle to an octagon with a size not greater than 8 mm×8 mm; washing and drying the flake PET material to obtain a flake PET material; and molding the flake PET material to make a toner bottle.

It is preferred that in the method of molding a toner bottle mentioned above, the moisture content of the flake PET material for molding is not greater than 3% by weight based on the weight of the PET.

It is still further preferred that in the method of molding a toner bottle mentioned above, the PET bottles are PET drinking bottles.

It is still further preferred that the method of molding a toner bottle mentioned above further includes thermally mixing the flake PET molding materials with at least one of a flame retardant and a toughening agent.

It is still further preferred that in the method of molding a toner bottle mentioned above, the mixing ratio of the flame retardant or the toughening agent is from 1 to 5% by weight based on the weight of the flake PST molding material.

It is still further preferred that in the method of molding a toner bottle mentioned above, the flame retardant or the toughening agent is a polycarbonate resin or a polyhydric phenol.

As another aspect of the present invention a toner bottle is provided which is obtainable using the method of molding a toner bottle mentioned above.

It is preferred that the toner bottle mentioned above contains an antistatic agent.

It is still further preferred that the method of molding a toner bottle mentioned above further includes sorting PET bottles that have not accommodated oily or colored materials from collected PET bottles to provide the sorted PET bottles These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE PREFERRED EMBODIMENTS

The present invention will he described below in detail with reference to several embodiments and accompanying drawings First, the toner bottle of the present invention is described.

Figure 2:
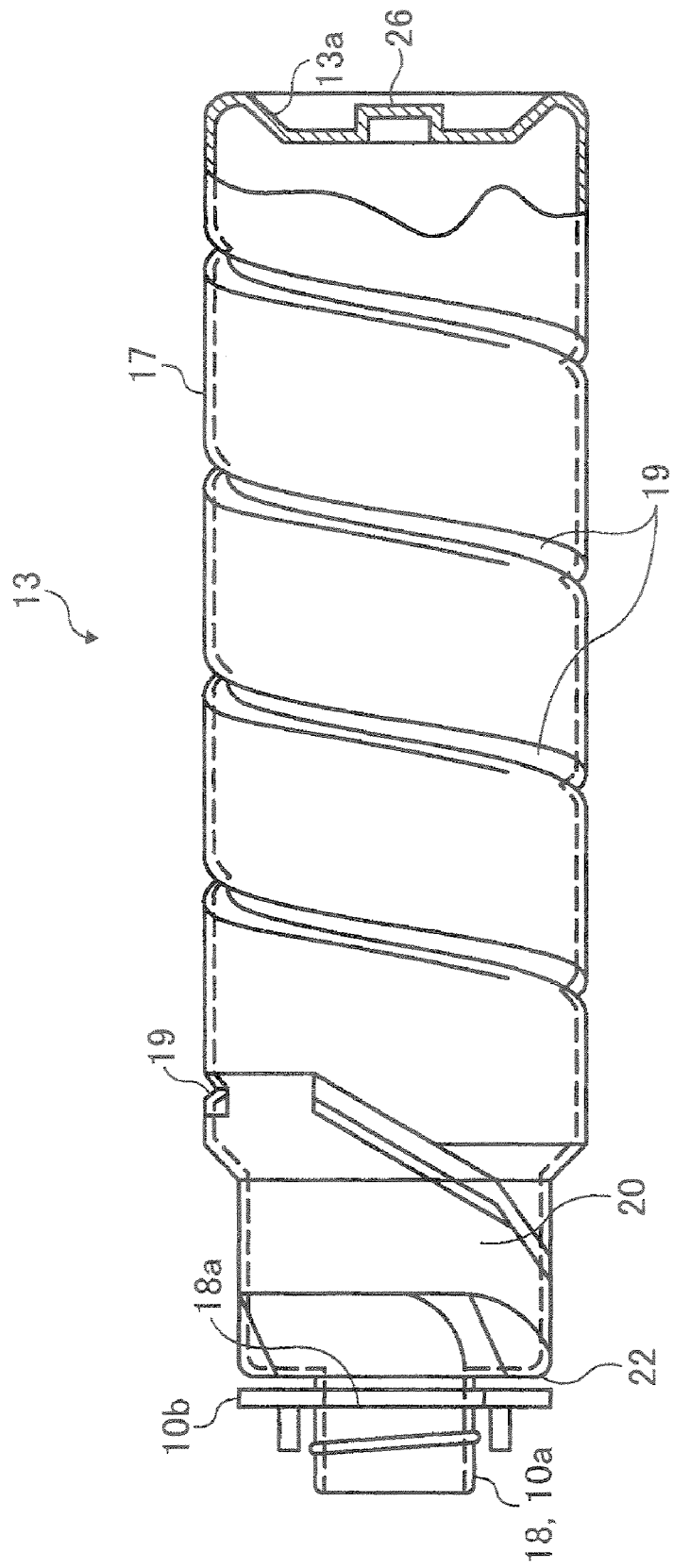
FIG. 2 is a cross section illustrating a lateral side of the toner bottle of the present invention.

FIG. 2 represents a diagram showing the shape of a toner bottle 13. A disc flange 10b is present in the toner bottle in FIG. 2. The toner bottle 13 has a main body 17 having a long and thin cylinder with a bottom and a mouth 18 extruding and continuing from the main body along its axis. To promote discharging of toner, one pitch spiral rib 19 is provided in the side wall of the main body 17 which has cylindrical form.

About a half circumference of the side wall portion of the main body 17 adjacent to the mouth 18 is formed gradually toward to the axis thereto. This toner guiding part 20 continues from a spiral rib 19 and the portion of the toner grinding part 20 close to the side of the mouth 18 is formed crossing the internal diameter of the mouth 18 to assist supply of toner.

The mouth 18 includes a toner discharging mouth and a cylindrical portion. The end of the cylindrical portion is fitted in a cylindrical joint portion (typically referred to as packing) provided in an image forming apparatus so that the toner bottle 13 is attached to the image forming apparatus in a horizontal position such as lying. The toner bottle 13 rotates along the axis thereof so that the toner is discharged from the discharging mouth and supplied to a developing portion of the image forming apparatus to form a desired image. The main body 17 of this type of the toner bottle 13 has a wall thickness greater than 1 mm to improve the mechanical strength thereof so that the toner bottle can withstand the stress exerted by the rotation driving device.

A resilient sealing material is typically attached to the inner wall of the cylindrical joint portion provided in an image forming apparatus to secure the connection to the toner bottle and prevent the toner from escaping. However, when the toner bottle rotates during image formation the toner leaks from between the cylindrical joint portion and the cylindrical portion and scatters so that the toner may contaminate not only the inside of the image forming apparatus but also the peripheral portion thereof. When a recycling PET material is used for manufacturing a toner bottle of the present invention such leaking is less frequent and less secure in comparison with a toner bottle formed of a virgin resin.

As a method of fortifying the strength of a toner bottle, JOP 2002-221858 describes a technology in which the side wall of the main body of a toner bottle is colored white or whitish. The use of the white or whitish sidewall fortifies and stabilizes the toner bottle and further improves the bottles dimensional stability. This is thought to be because the material forming the sidewall is in a semi-crystalline state. The color tone of white is thought to be dependent on the degree of the semi-crystalline state. This whitening is smoothly achieved in the case of a toner bottle using a recycled PET material for use in the present invention, a virgin PET material and other resin materials, for example, olefin resins in combination. Such a toner bottle has a light blocking effect and is effective to protect the quality of toner in the bottle.

Figure 1A:
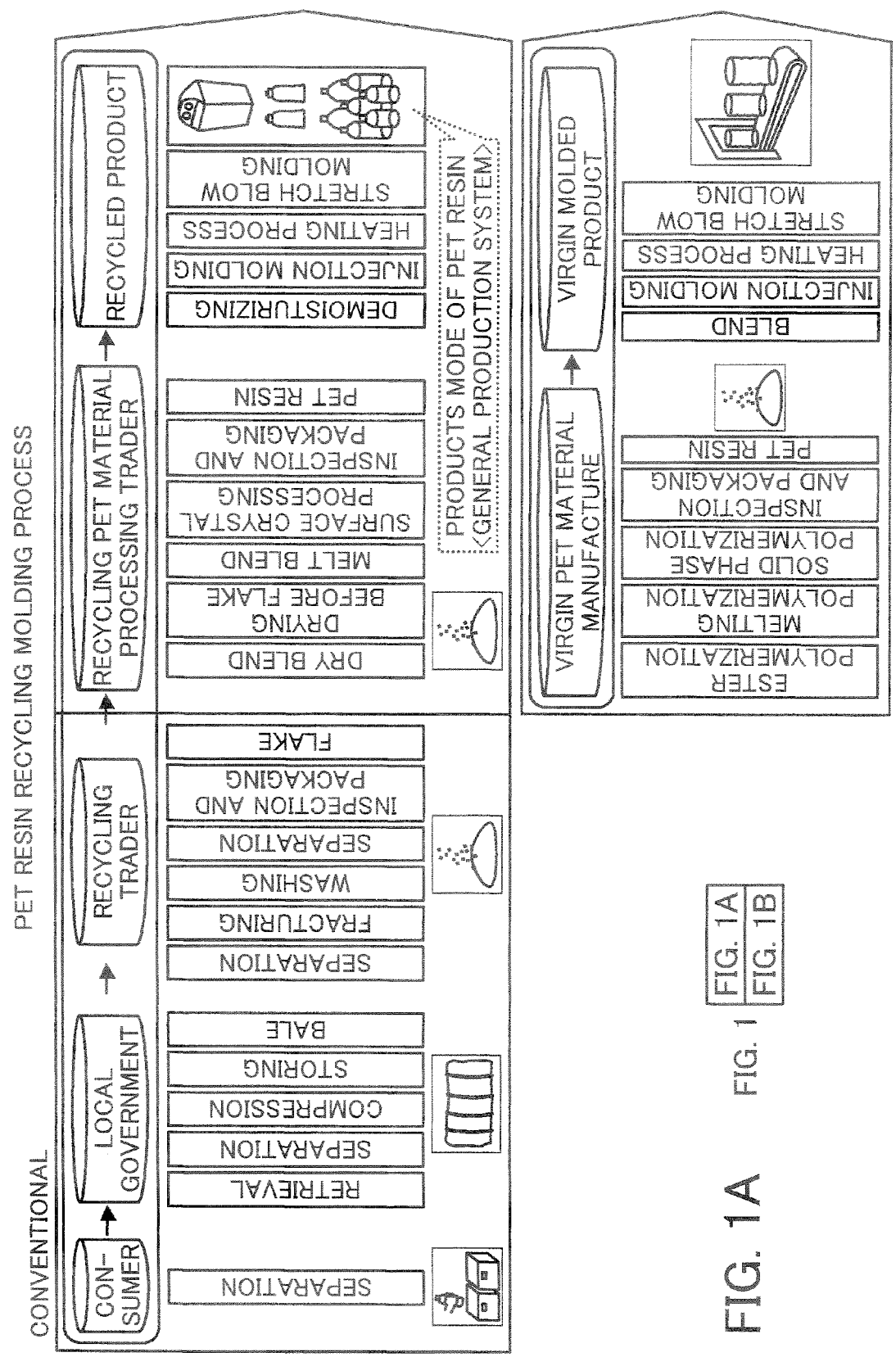
FIG. 1A is a schematic diagram illustrating the conventional toner bottle molding method.
Figure 1B:
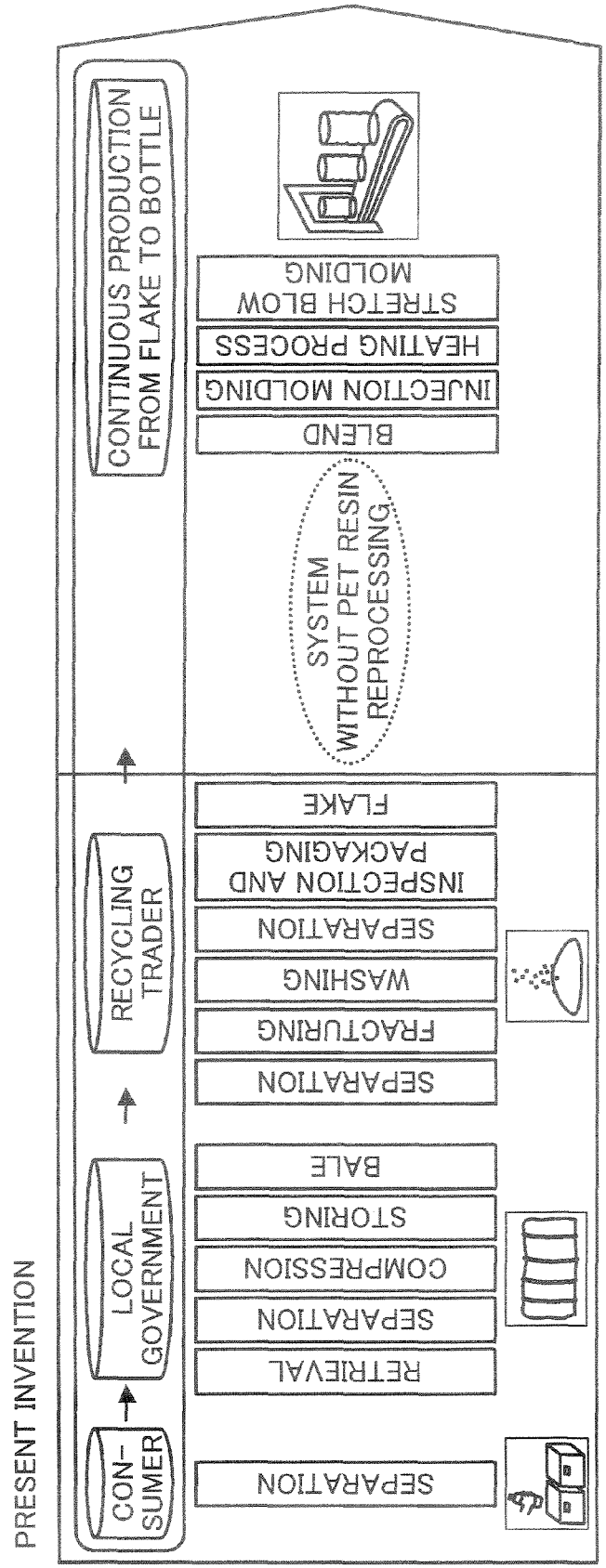
FIG. 1B is a schematic diagram illustrating the inventive toner bottle molding method.

The PET toner bottle is different from PET bottle for drinking because, e.g., toner bottles are not required to be excessively transparent nor have any constraint based on the food hygiene law. Toner bottles preferably provide uniformity, powder discharging property, dimension stability of the mouth portion of a bottle (i.e., fitting and rotation property of the joint portion of the mouth and a toner receiving mouth of an image forming apparatus), etc. Considering that toner bottles and PET bottles for drinking are formed of the same or similar materials (e.g., bottle), recovered PET drinking bottles satisfy the characteristics mentioned above for a toner bottle. As shown in FIG. 1B, recycled PET bottles are collected by a recycling trader and sent to a recycling PET material processor. However, the recycling PET material processor does not have to process the recycled bottles to materials for molding. Rather, it is important to separate collected PET bottles and obtain uniform fragments which do not cause problems during molding.

In the present invention, collected PET bottles for drinking including labels and caps, which are formed of different materials (i.e., other polyester materials) are ground, washed and separated into PET materials and other materials based on the difference of the relative gravity therebetween. Foreign materials, for example, metals, are removed by magnet or air classification.

Dried flakes are sent for further processing but the form and moisture content of the flakes vary.

In the present invention, the size and the form of ground flake PET obtained from collected PET bottles is a shape that fits within a square of 8 mm×8 mm at greatest, preferably a square of from 2 to 8 mm×2 to 8 mm and further preferably a square of from 3 to 6 mm×3 to 6 mm. A flake that is too large may clog in an injection molding device.

The form of flakes can be controlled by filtering using a sieve. Flakes left on the sieve can be further ground for adjustment In addition, in the present invention, 80% by weight, preferably 90% by weight, of the flake PET mentioned above has polygons ranging from triangles to octagons.

The form of the flake particles preferably ranges from triangular to hexagonal and more preferably from triangular to pentagonal.

Flakes having a form with the same or more edges than a nonagon, i.e., mica form or frayed form, tend to clog injection molding devices.

Flakes having a mica form and/or a frayed form are produced when a blunt blade is used. Therefore, it is possible to prevent the production thereof by sharpening or exchanging blades.

Figure 5A:
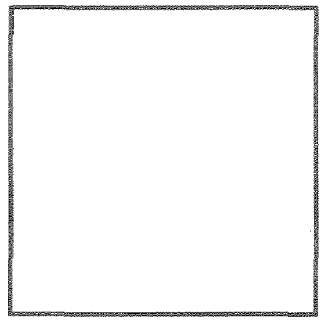
FIG. 5A is a diagram illustrating a preferred form of a flake.
Figure 5B:
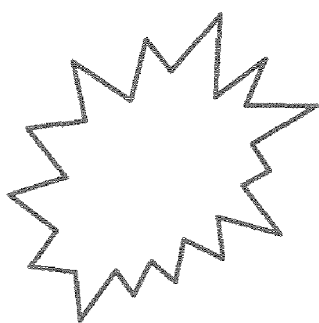
FIG. 5B is a diagram illustrating a non-preferred form of a flake.

FIG. 5A is a diagram illustrating a preferred form of a flake and FIG. 5B is a diagram illustrating a non-preferred form thereof.

The wall thickness of a PET bottle for drinking typically ranges from 2 mm at the thickest portion to 0.2 mm at the thinnest.

The moisture content of the flake PET is not greater than 3% by weight, preferably not greater than 1% by weight and more preferably not greater than 0.5% by weight based on the weight of the PET resin.

Flake PET having an excessive moisture may crystallize in an injection molding device and stop a screw inside thereof. When a thin walled PET bottle is molded, it is generally desired to dry the PET bottle before molding until the moisture content of the PET resin thereof is not greater than 0.01% and preferably not greater than 0.005% to avoid hydrolytic degration during molding caused by heating and melting (See for example pp. 616-617 about PET bottle molding technology in "Saturated Polyester Resin Handbook", authored by Kazuo Yugi, published on Dec. 22, 1989 by Nikkan Kogyo Shimbun, Ltd.; incorporated herein by reference)

The moisture content is preferred to be as less as possible. When the moisture content is high, it is desired to reduce the moisture content as much as possible by air drying.

The moisture content can be measured by a PET resin moisture content measuring method described in, for example, JOP 2004-3876, etc., incorporated herein by reference.

As a material for use in a toner bottle, a PET bottle for drinking is preferred.

One reason therefor is that a PET bottle for drinking is materially stable because the PET bottle for drinking is formed of non-recycled PET in light of safety and health.

It is preferred that a toner bottle is not made of only this recycling material but made of a combination of the recycling material and virgin resins. Thereby, the variance of characteristics can be restrained and the molding property is stable.

PET bottles for drinking which fail to pass the quality test at a production line can be also used with no problem.

In contrast bottles which were filled with soy bean source and/or oil are not suitable because it is difficult to remove the soy bean source and/or oil attached to the inside of the bottles.

Flame resistance or strength of a toner bottle is improved by thermally mixing the above described flake PET with a flame retardant and/or a toughening agent.

The content of such a flame retardant or a toughening agent is from 1 to 5 wt %, preferably from 1 to 4 wt % and more preferably from 1.5 to 3 wt % based on the weight of the flake PET.

An excessive addition thereof may cause peeling (separation) and/or release of PET.

Specific examples of flame retardants or toughening agents include polycarbonate resins and polyhydric phenols. Specific examples of polyhydric phenols include tannins and catechins.

Injection molding can be made easy by using PET flake material having the shape and dimensional characteristics described above, which enables continuous production.

Transparency, which is characteristic to other typically newly used PET materials, is not especially required for a toner bottle. Suitable wall thickness is desired and dimension accuracy has a safety margin therefore.

While a toner bottle is used, toner easily attaches the wall of the toner bottle by electrostatic force. To improve this drawback, it is preferred to add an antistatic to the material for use in the toner bottle. Thereby, the amount of toner remaining in a toner bottle can be reduced.

Below is a description about a method of injection molding.

Figure 3:
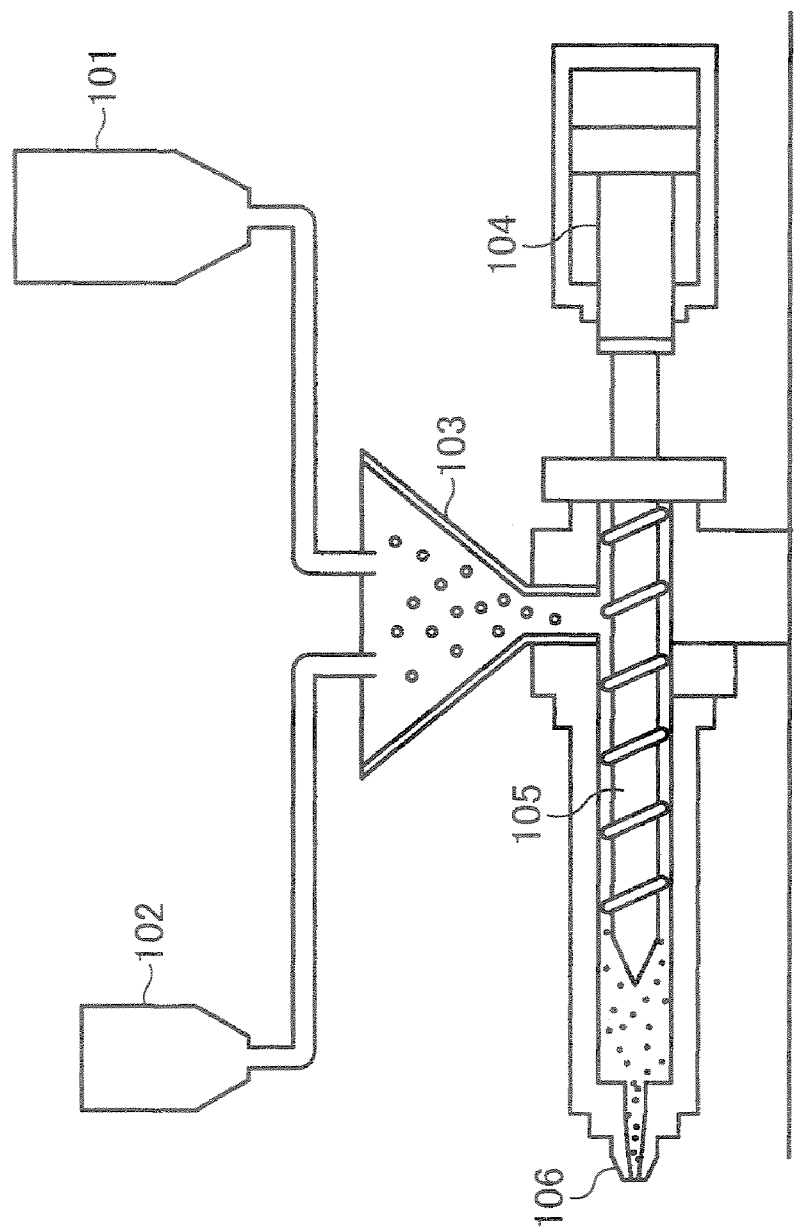
FIG. 3 is a diagram illustrating an example of an injection molding machine for use in the present invention.

FIG. 3 is a basic diagram illustrating an example of a device for performing the mixing and/or melting for method mentioned above. In FIG. 3, 101 represents a hopper drier for PET, 102 represents a hopper drier for a mixture of a recycling material, resins other than the PET and plasticizing agent, 103 is a hopper, 104 is a cylinder, 105 is a screw and 106 represents a nozzle.

Materials which have passed through the two hopper driers 101 and 102 and collected at the hopper 103 are pulverized and mixed (e.g., kneaded by the screw 105 in rotation. Subsequent to thermo fusion, the mixture is extruded from the nozzle 106 as a material for forming a toner bottle and sent to the next process, injection molding.

PET flakes having an unsuitable for clog in the hopper 103. When the moisture content thereof is not suitable, the PET flakes tend to be crystallized upon application of heat and stop there.

A biaxial stretch blow molding method is described with regard to a toner bottle among the toner bottles of the present invention in which the mouth portion and the rain body are integrally formed with a board flange provided on the cylindrical form portion of the mouth.

A biaxial stretch blow molding method is preferred to manufacture the toner bottle of the present invention which preferably has a good molding accuracy but the present invention is not limited to bottles manufactured by the biaxial stretch blow molding method.

A biaxial stretch blow molding method typically has two steps, which are: a preform process in which a preform is formed by injection molding; and a stretch blow molding process in which the preform (parison) extracted (cooled down) after molding is heated and softened, and blow-molded and stretched simultaneously. Since the mouth portion of a toner bottle is hardly changed from the mouth portion of the preform, the mouth portion of the preform is preferably formed by injection molding such that the requisites of the mouth of the toner bottle of the present invention are satisfied.

Figure 4A:
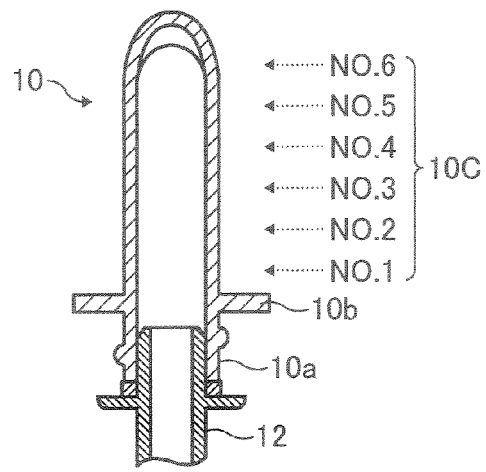
FIG. 4A is a diagram illustrating the basic structure of a preform.

FIG. 4A is a diagram illustrating the basic structure of a preform 10 having a mouth portion 10*a*, a support ring portion 10*b* and a stretch blow portion 10*c*. In the case of the toner bottle of the present invention, the mouth portion 10*a* and the support ring portion 10*b* of the preform 10 actually form the mouth portion of a bottle and a board flange having a circular form, respectively. Circularity and concentricity of the toner bottle substantially depends on the molding accuracy of the preform 10.

Therefore the die for injection molding is a key and it is desired to adjust the die accuracy such that a mouth portion having a desired circularity is formed. The same applies to the concentricity. After forming the preform 10, it is effective to start the next process of heating and softening before the preform 10 is completely cooled down especially to prevent the distortion of the mouth and the support ring of the preform 10.

To soften the preform 10, it is desired to heat multiple portions selected depending on the form of a finally obtained toner bottle at different temperatures while rotating the preform 10 around the axis thereof. After achieving the state in which each of the multiple portions is differently softened the preform 10 is stretched and blown to obtain a toner bottle having a desired form. In FIG. 4A, the portions No. 1 to No. 6 of a stretched and blown portion 10c in the preform 10 indicated by the arrows represent the multiple portions heated at different temperatures.

In the present invention, the temperature immediately after the heating the preform is desired to be higher than the glass transition temperature of the resin. Subsequent to softening, the preform 10 is gradually cooled down and the next process of stretch blow molding is preferably performed before the preform 10 is completely cooled down.

When PET is used as a resin, the glass transition temperature thereof is about 76° C. Meaning, the preform 10 is heated at a temperature not lower than the glass transition temperature. When the preform 10 is heated at a temperature between about 85 to about 100° C., the perform 10 can be easily stretched along the axis (longitudinal) direction during stretching so that the wall thickness can be thinned. When the preform 10 is heated at a temperature between about 105 to about 115° C., the preform 10 is whitened and hard to be stretched along the axis (longitudinal) direction but along the circumference direction so that the wall thickness can be thickened.

That is, after naturally cooling down, the preform 10 has a high surface temperature but is crystallized; the preform is difficult to stretch in the longitudinal direction and consequently is stretched in the lateral direction.

Therefore, it is desirable to select the heating temperature depending on the form of the toner bottle. For example, the body portion is molded at a temperature from 85 to 100° C. and the toner guiding part 20 (in FIG. 2) is molded a higher temperature, i.e. from 105 to 115° C. Whitened portions have a high strength so that the whitened portions are especially suitable for portions requiring dimension stability and a high strength.

In the next step of the biaxial stretch blow molding, the reform 10 is fitted into a carrier pin 12. Excluding the root portion of the preform 10, the preform 10 is strongly stretched along the circumference direction by the blowing air in the die and also strongly stretched to the base direction (axis direction) by pressure by a stretching rod (stretching pin) SP. Like when blowing a thin and long rubber balloon, the stretched portion gradually increases from the mouth portion of a tone bottle to the base direction, non-stretched portion to the base direction decreases and finally the base portion is biaxially stretched. This is how a toner bottle having a desired form, in which the mouth portion and the in body are integrally formed, is formed.

The biaxial stretch blow molding method is described with reference to FIG. 4B as follows. Transfer the preform 10 heated by a heater while set in the carrier pin 12 to a die; Close the die; Insert a stretch pin (SP) into the preform 10 from the mouth thereof; and stretch the base of the preform 10 by the stretch pin (SP) while infusing compressed air. The preform 10 is stretched by moving the stretch pin (SP) back and forth along the axis of the preform 10. Next, a pair of the side die halves 14 and 15 are mold-opened and a bottom die 16 is transferred in the direction away from a base 13a of a bottle 13 to pull out the bottle 13 in this series of process it is possible to optimally adjust the conditions, for example, the temperature and the position of the heater the pressure of the air infused from the carrier pin 12 to the preform 10 and the transfer timing of the stretch pin (SP) to the molding of the toner 13.

Figure 4B:
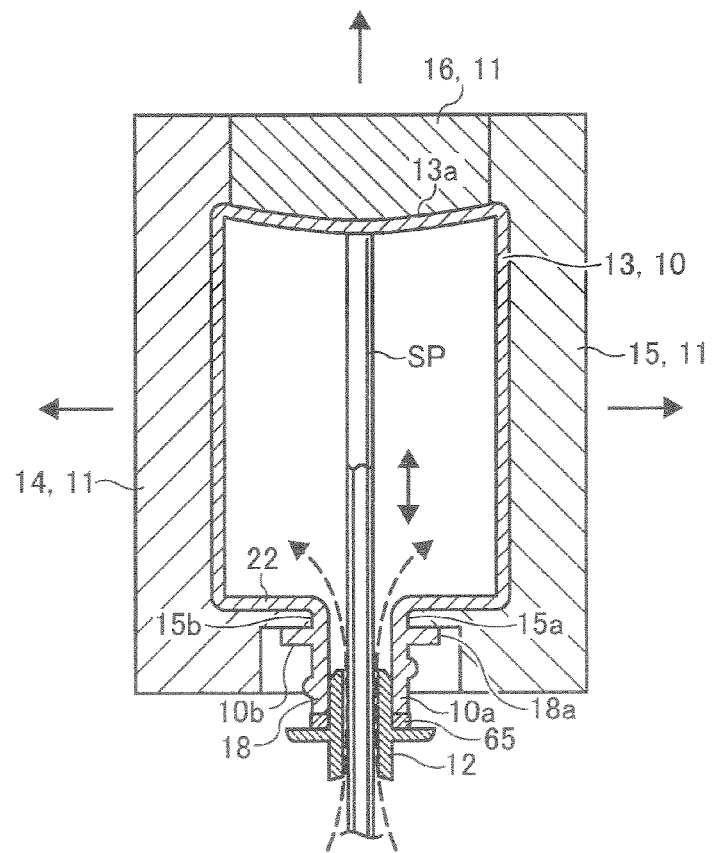
FIG. 4B is a diagram illustrating a toner bottle molding process for use in the present invention.

As illustrated in FIG. 4B, the pair of the side die halves 14 and 15 of a die 11 have relatively thin extruding portions 15a and 15b at the portion adjacent to the support ring 10b. By these extruding portions 15a and 15b, a base portion 18a of the mouth portion 18 and a shoulder portion 22 continuing to the base portion 18a are formed as illustrated in FIG. 2.

Having generally described preferred embodiments of this invention, further understanding can be obtained by reference to certain specific examples which are provided herein for the purpose of illustration only and are not intended to be limiting.

EXAMPLES

PET recycling and molding a toner bottle of the present invention are described with reference to the Example. In the Example, a toner bottle having a specific for is used for description but the present invention is not limited thereto.

Flakes may be obtained by grinding collected PET bottles used for drinking as a raw material as follows, a toner bottle (500 g) illustrated in FIG. 2 is manufactured by the injection molding machine illustrated in FIG. 3 and the biaxial stretch blow molding method illustrated in FIG. 4.

Example 1

Using a sieve having 8 mm mesh filter materials are ground from recycled PET drinking bottles.

The average size of the resulting filtered flake is 5.2 mm.

85% of the filtered flake is in a form of an octagon; frayed or mica form flakes are removed.

The moisture content is measured by a method of measuring PET resin moisture ratio described in JOP 2004-3876 (incorporated herein by reference) and is 10% by weight based on the weight of the dried PET. Therefore, the flakes are dried by air until the moisture content thereof is 12 wt %.

Polycarbonate is added in amount of 2% based on the weight of fractured PET flakes when injection molding is performed. Toner bottles are continuously manufactured without a stop during the injection molding and the resulting toner bottles have a sufficient strength.

Comparative Example 1

Injection molding is performed in the same manner as in Example 1 except that filtering with a sieve having 8 mm mesh and moisture adjustment are omitted.

The PET flake has an average of 15 mm in size and a moisture content of 10%.

When manufacturing toner bottles, the flakes clog in the hopper because of the size thereof. In addition, the flakes contain moisture in a relatively large amount so that the flakes are crystallized, thereby hindering the rotation of the screw. Therefore, it is impossible to manufacture toner bottles.

This document claims priority and contains subject matter related to Japanese Patent Application No. 2006-025314, filed on Feb. 2, 2006, the entire contents of which are incorporated herein by reference.

Having now fully described the invention, it will be apparent to one of ordinary skill in the art that many changes and modifications can be made thereto without departing from the spirit and scope of the invention as set forth therein.

The invention claimed is:

1. A method of molding a toner bottle comprising:
   grinding sorted PET bottles to obtain a flake PET material comprising PET flakes having three sides, PET flakes having five sides, PET flakes having six sides, and PET flakes having eight sides;
   filtering the flake PET material to remove PET flakes having nine or more sides and to form a screened flake PET material of which not less than 80% by weight of the PET flakes, based on the weight of the screened flake PET material, have a form of a polygon having three sides, a polygon having five sides, a polygon having six sides, and a polygon having eight sides, wherein the polygons have a size not greater than 8 mm×8 mm;
   washing and drying the screened flake PET material to obtain a flake PET molding material; and
   injection molding the flake PET molding material to form a toner bottle perform; and
   blow molding the toner bottle preform to form the toner bottle.

2. The method of claim 1, wherein at least 85% of the screened flake PET material is in the form of octagons.

3. The method of claim 1, wherein not less than 90% by weight of the flake PET material have a form of a polygon having from three to eight sides with a size not greater than 8 mm×8 mm.

4. A method of molding a toner bottle comprising:
   grinding sorted PET bottles to obtain a flake PET material comprising PET flakes having three sides and PET flakes having five sides;
   filtering the flake PET material to remove PET flakes having nine or more sides and to form a screened flake PET material of which not less than 80% by weight of the PET flakes, based on the weight of the screened flake PET material, have a form of a polygon having three sides and a polygon having five sides, wherein the polygons have a size not greater than 8 mm×8 mm;
   washing and drying the screened flake PET material to obtain a flake PET molding material; and
   injection molding the flake PET molding material to form a toner bottle perform; and
   blow molding the toner bottle preform to form the toner bottle.

5. The method of claim 1, wherein not less than 90% by weight of the flake PET material has a form of a polygon having from three to eight sides with a size not greater than 8 mm×8 mm.

6. A method of molding a toner bottle, comprising:
   grinding sorted PET bottles to obtain a flake PET material comprising PET flakes;
   sieving the flake PET material to form a screened flake PET material of which not less than 80% by weight of the PET flakes, based on the weight of the screened flake PET material, are in triangular form and pentagonal form, with a size not greater than 8 mm×8 mm;
   washing and drying the screened flake PET material to obtain a flake PET molding material;
   injection molding the flake PET molding material to form a toner bottle preform; and
   blow molding the toner bottle preform to form the toner bottle.

7. The method of molding a toner bottle according to claim 1, wherein not less than 80% by weight of the PET flakes are in the form of triangles, pentagons, hexagons and octagons.

8. The method of molding a toner bottle according to claim 4, wherein not less than 80% by weight of the PET flakes are in the form of triangles and pentagons.

9. The method of molding a toner bottle according to claim 1, wherein not less than 90% by weight of the PET flakes are in the form of triangles, pentagons, hexagons and octagons.

10. The method of molding a toner bottle according to claim 4, wherein not less than 90% by weight of the PET flakes are in the form of triangles and pentagons.

* * * * *